April 4, 1961     F. L. HAUSHALTER     2,977,819

VIBRATION DAMPER

Filed Jan. 26, 1959

INVENTOR
FRED L. HAUSHALTER

BY *Whittemore, Hulbert & Belknap*

ATTORNEYS

United States Patent Office 2,977,819
Patented Apr. 4, 1961

2,977,819

VIBRATION DAMPER

Fred L. Haushalter, 2185 Scott Lake Road,
Pontiac, Mich.

Filed Jan. 26, 1959, Ser. No. 789,027

8 Claims. (Cl. 74—574)

The present invention relates to vibration dampeners or shock absorbers, and more particularly to yieldable means between elements which are relatively movable with respect to each other. One embodiment of the invention is its application to a rotating hub having an inertia member associated therewith, there being a resilient insert interposed between the hub and the inertia member. Specifically the invention pertains to a composite insert including rubber or similar yieldable material, the insert being stretched into a space between concentric surfaces and being under tension as well as under compression. The insert when so positioned in this relation to the spaced concentric members holds them firmly assembled, but permits limited relative rotation of one member relative to the other, thus functioning to dampen torsional vibrations or shocks.

It is one of the objects of the invention to provide a novel form of composite insert to be inserted between a pair of concentric members, the assembly being adapted to minimize vibrations and shocks.

It is another object of the invention to assemble the several parts by employing a novel series of operations to complete the vibration damper.

Other objects will be apparent from the following description of the dampener.

The invention will be understood from the following description and the accompanying drawing, wherein.

Figure 4:
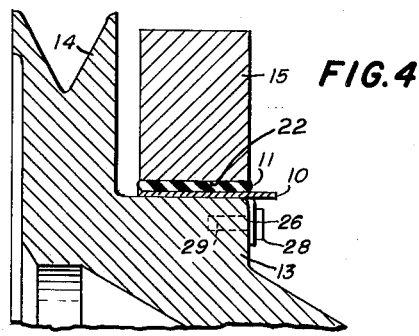
Fig. 4 is a fragmentary sectional view of the insert and concentric members after the insert shown in Figs. 1 and 2 has been inserted between said concentric members.

In the drawing, it will be seen that the insert initially comprises a flat rectangular metal strip 10, preferably steel, to one side of which are bonded a plurality of shaped resilient elements or slabs 11 formed from rubber or other curable elastomer. These elements are securely bonded to the metal strip by curing the elements to the strip. By bonding the rubber to a thin steel band, either in a continuous band or in sections, the pressure of vulcanization is at right angles to the plane of the metal, or directly down on the metal, so that a good bond is obtained. Then again, a better bond is obtained on steel than on cast iron. The steel band with the bonded rubber can be bent around the hub member. This is preferable to bonding a continuous ring of rubber onto the inner surface of the inertia member, then pressing this onto the hub member with the aid of a lubricant. This involves quite costly molds, and, furthermore, the bonding of the rubber to the cast iron inertia member is rather uncertain. While the elastic elements are shown as being in spaced relation, the invention is not so limited, it being contemplated that under certain conditions it may be desirable to provide a continuous band of rubber or like material on one side of the metal strip, as indicated by dotted lines at 12. It will be observed in the several figures that the width of the rubber elements 11 is somewhat less than that of the metal strip 10, it being intended that, after assembly, a portion of the metal strip protrude axially therefrom, as shown in Fig. 4. The main purpose of having this portion protrude is to provide for relative movement of portions of the rubber with respect to the metal strip and for cooling the insert, there being a tendency for the rubber to become heated by the continuous deformations to which it is subjected under operating conditions.

Figure 1:
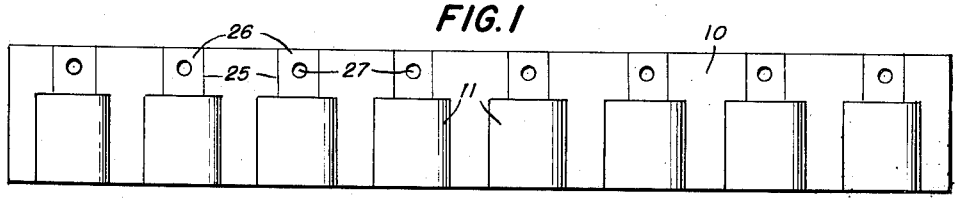
Fig. 1 is a top plan view of the initial form of composite insert.
Figure 2:
Fig. 2 is a side elevational view of the insert shown in Fig. 1.
Figure 3:
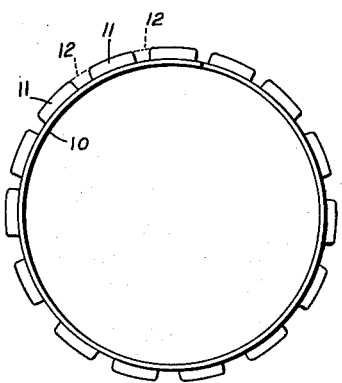
Fig. 3 is an end view of the insert shown in Figs. 1 and 2 after being bent to circular form for insertion into the assembly.

After the rubber elements 11 have been bonded to the flat metal strip 10, the composite metal and rubber insert is bent to circular form as shown in Fig. 3, the rubber elements then being circumferentially spaced therearound. In this form it is forced into the space between the concentric surfaces of two rotatable members, such as the hub 13 of pulley 14, and an inertia member 15 which may be an annular mass of metal. The combination of a pulley keyed to a crank shaft (not shown), and the use of an inertia member is conventional, and various forms of dampening rings or the like interposed between the inertia member and a rotatable body have been employed. The present invention, therefore, resides in the novel form of composite insert and the manner of forming and assembling it with the rotatable members.

As shown in Fig. 4, the inertia member 15 and the hub 13 are in concentric relation, thus providing an annular space 22 between members 13 and 15. The radial width of this space 22 is less than the initial combined cross-sectional thickness of the rubber elements 11 and metal strip 10 forming the composite insert. A suitable annular tool (not shown), may be employed to impose sufficient pressure on the free edge of the metal strip 10 to force the composite insert into space 22. Since the radial width of this space is less than the initial thickness of the insert, the rubber will be stretched a substantial amount and placed under tension as it is forced between concentric members 13 and 15. At the same time the rubber tends to assume its original form and, since it occupies a space less than that of the initial thickness of the rubber, it will also be under compression. The insert, when fully introduced into the space 22, as shown in Fig. 4, is elongated and under compression, but the tendency of the rubber to resume its initial form effects an intimate frictional bond between the insert and the concentric members 13 and 15.

Preferably, the metal strip 10 is cut at spaced intervals, as at 25, to provide tongues 26 adapted to be bent at a right angle to the remainder of the strip. Each tongue 26 is punched to provide apertures 27 through which threaded screws 28 extend into threaded openings 29 in the hub 13, as shown in Fig. 4. In this way the insert may be firmly attached to the hub 13 while the unbent portions of the annular insert between the tongues 26 extend axially to provide for dissipation of heat resulting from deformation of the rubber bushing.

While the bonding of the rubber elements 11 to the metal strip 10 has been described as being effected by curing the rubber on the metal, the rubber may be adhered to the metal by other suitable methods such as by adhesives. The preferred initial step is one in which the rubber elements are bonded to a flat metal strip which is subsequently bent to circular form, but it is within the concept of the invention to bond rubber elements to a preformed continuous metal band. Other modifications within the terms of the claims are also contemplated.

I claim:

1. The combination with spaced apart inner and outer relatively rotatable members provided with opposed cylindrical surfaces concentric with the axis of rotation, of said members and providing an annular space therebetween, of a yieldable connection between said rotatable members disposed within said annular space and comprising a separate preformed composite insert including a relatively thin substantially annular metal strip within said annular space and concentric with said cylindrical surfaces, one surface of said strip being in surface to surface frictional engagement with one of said cylindrical surfaces, and a series of individual slabs of elastic material constituting vibration dampening means for said rotatable members bonded in surface to surface relation to the other surface of said strip at spaced points thereof and disposed in surface to surface frictional engagement with the other of said cylindrical surfaces, the radial width of the annular space aforesaid being less than the initial combined over-all cross sectional thickness of said strip and any of said individual slabs, whereby said entire insert is under compression between said cylindrical surfaces.

2. The structure defined in claim 1, wherein a portion of said strip is bent at an angle to the remainder thereof and is secured to one of said rotatable members.

3. The structure defined in claim 1 comprising tongues projecting from said strip at circumferentially spaced points thereof and secured to one of said rotatable members.

4. The structure defined in claim 1, comprising tongues projecting from said strip at circumferentially spaced points thereof and overlying portions of one of said rotatable members, and separate means securing said tongues to said one rotatable member.

5. The structure defined in claim 1, wherein said strip has circumferentially spaced free portions extending axially outwardly beyond the cylindrical surfaces of said rotatable members into the surrounding atmosphere for heat dissipating purposes, and has between said circumferentially spaced free portions circumferentially spaced tongues bent over and secured to one of said rotatable members.

6. The structure defined in claim 1, wherein the width of said strip is greater than the width of any of said individual slabs, and all of said individual slabs are closer to one circumferentially extending edge of said strip than to the other thereof.

7. The structure defined in claim 1, wherein the individual slabs are of uniform size and shape.

8. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space and concentric with said cylindrical surfaces, one surface of said strip being in surface to surface frictional engagement with one of said cylindrical surfaces, and elastic material constituting vibration dampening means for said rotatable members bonded permanently in surface to surface relation to the other surface of said strip and disposed in surface to surface frictional engagement with the other of said cylindrical surfaces, the radial width of the annular space aforesaid being less than the initial combined over-all cross sectional thickness of said strip and elastic material, whereby said entire insert is under compression between said cylindrical surfaces.

References Cited in the file of this patent

UNITED STATES PATENTS

| 1,716,497 | Macauley | June 11, 1929 |
| 1,931,027 | Lee | Oct. 17, 1933 |
| 2,198,135 | Strasburg et al. | Apr. 23, 1940 |
| 2,594,555 | Hardy | Apr. 29, 1952 |
| 2,664,763 | Sarazin | Jan. 5, 1954 |
| 2,795,036 | Haushalter | June 11, 1957 |
| 2,795,037 | Haushalter | June 11, 1957 |
| 2,834,226 | Hirst | May 13, 1958 |

FOREIGN PATENTS

| 650,891 | Great Britain | Mar. 7, 1951 |